Jan. 19, 1954   O. L. GARRETSON ET AL   2,666,448
SELF-SEALING RELIEF VALVE

Filed July 29, 1946   2 Sheets-Sheet 1

INVENTORS
O. L. GARRETSON
C. O. HENNEMAN
BY
ATTORNEYS

Jan. 19, 1954     O. L. GARRETSON ET AL     2,666,448
SELF-SEALING RELIEF VALVE

Filed July 29, 1946     2 Sheets-Sheet 2

INVENTORS
O. L. GARRETSON
C. O. HENNEMAN

ATTORNEYS

Patented Jan. 19, 1954

2,666,448

UNITED STATES PATENT OFFICE 2,666,448

SELF-SEALING RELIEF VALVE

Owen L. Garretson and Clarence O. Henneman, Bartlesville, Okla., assignors to Phillips Petroleum Company, a corporation of Delaware Application July 29, 1946, Serial No. 686,855

2 Claims. (Cl. 137—540)

This invention relates to pressure relief valves. In one of its more specific aspects it relates to pressure relief valves adapted to avoid leakage at pressures approaching that at which the valve opens.

In conventional relief valves there is a tendency for the valves to leak as pressure approaches the valve opening pressure. In many such valves this leakage is appreciable and over periods of time product loss may reach a sizable figure. In case of hydrocarbon gas storage or storage of other inflammable or noxious gases, leakage may present hazards, especially in enclosures.

One object of our invention is to provide a non-leaking pressure relief valve.

Another object of our invention is to provide a pressure relief valve so designed that the higher the inlet pressure upon the valve mechanism the tighter will be the seal against leakage until the valve opening pressure is reached.

Another object of our invention is to provide such non-leaking pressure relief valves as are simple and inexpensive to manufacture.

Still another object of our invention is to provide a non-leaking pressure relief valve in which the non-leaking feature may be adjustable and positive in its action.

Still other objects and advantages of our invention will be apparent from a careful study of the following disclosure and attached drawing which respectively describes and illustrates preferred forms or embodiments of our invention.

In the drawing,

Figure 1 is a diagrammatic sectional elevation of a preferred form of our relief valve taken on the line 1—1 of Figure 1a.

Figure 1:
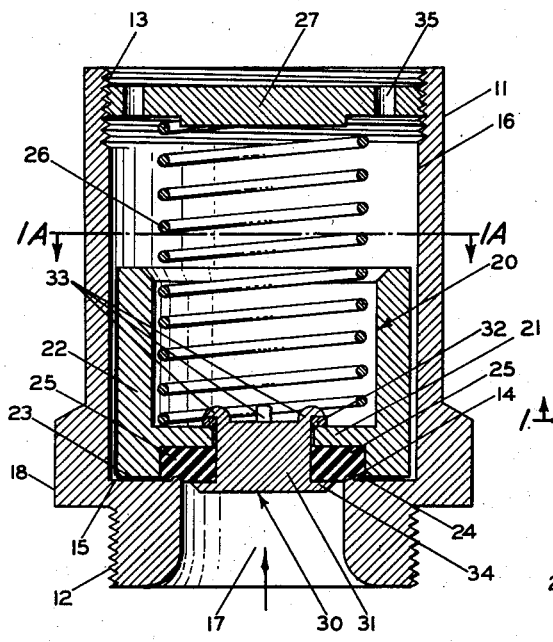
Figure 1A:
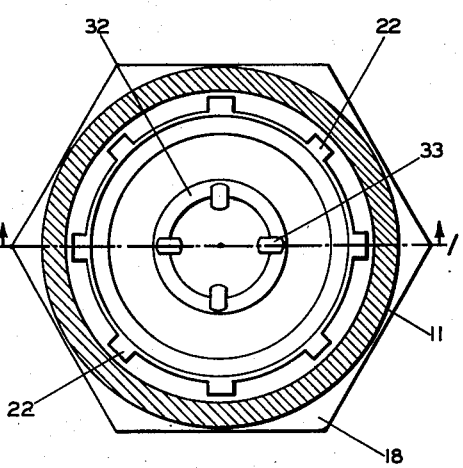
Figure 1a is a cross section of this valve taken on the line 1a—1a of Figure 1.

Referring now to the drawing and especially to Figure 1, a valve body 11 has an exterior threaded section 12 and an interior threaded section 13. This exterior threaded section is of such diameter and threads as to fit in a gas-tight manner in a cylinder or tank, not shown, and in which gas under pressure is stored. An opening 17 in this body member 11 terminates in a small circular flange or shoulder having smooth and rounded edges. Between this flange 14 and the sidewall of the body is an annular surface 15 which is machined to a smooth surface. The interior cylindrical surface 16 need not be highly machined since it is not intended to be a sealing surface; however, it should be free from burrs or other gross imperfections as would interfere with the free movement of a valve member 20. The threads 13 are cut into the wall 16 in such a manner as to permit free passage of the valve member 20. The lower exterior portion may be of hexagonal or other cross sectional form for ease of installation.

The valve member 20 is in general of an annular shape with its upper end fully open and its lower end having an annular shoulder 21. Guides 22 are provided on the exterior surface of the movable valve 20 to assist in keeping the lower valve surface 23 substantially parallel to the seat surface 15 at all times.

A resilient gasket 25 fits into its proper place below the valve shoulder 21 and above the valve seat 24. The small circular flange 14 pushes against and compresses a portion of the lower surface of the gasket.

A helical spring 26 held in place by a threaded nut 27 keeps the valve member seated at all times excepting when relieving excess pressure from within a container. The compressive force exerted by the spring 26 upon the valve assembly may be adjusted by adjustment of the compression nut 27. This nut has vent holes 35 through which gas may escape during operation of the valve.

In a central circular opening in the valve formed by the annular shoulder 21 is a disc rivet assembly 30. In the embodiment of Figure 1, this disc rivet assembly may be composed of two members, the disc rivet 31 and a ring member 32. Some points 33 are adapted when bent over as shown to hold the disc rivet member in place, the points resting against the ring 32. Other means may be used in holding the disc rivet in place. For example, two opposite points may be made wider than shown in the drawing, a pair of opposite points may be drilled and a cotter key inserted, or these points may have their exterior surface threaded to take a hold on a nut.

The lower portion of this disc rivet 30 has a flange 34 adapted to cover a portion of the resilient gasket 25, as shown in Figure 1, and yet be free for movement within the space 17.

Figure 2:
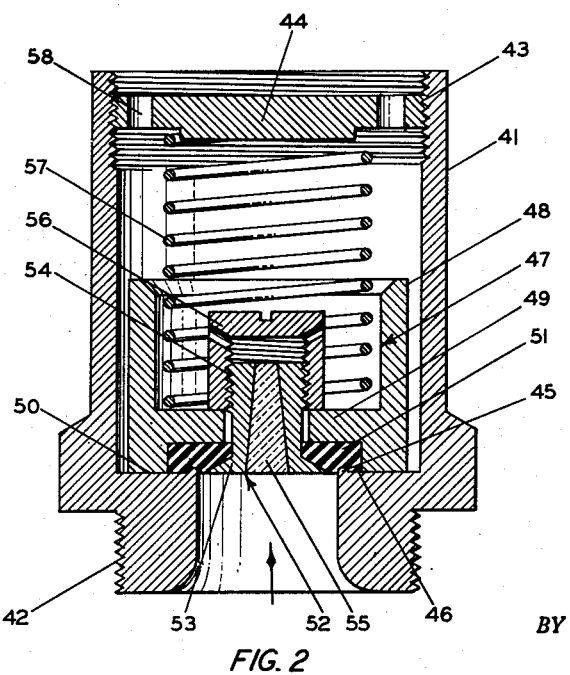
Figure 2 is a sectional elevation of another embodiment of our relief valve.

Figure 2 illustrates a second embodiment of our excess pressure valve. A valve body 41 has exterior threads 42 and interior threads 43 for attaching it to a pressure vessel, not shown, and insertion of a compression spring nut 44. This valve body 41 has, like that shown in Figure 1, an annular flange 45 and a seat 46. A movable valve 47 has some guide flanges 48, an annular flange 49 and a base surface 50. The flange 49 provides a space in which is inserted a resilient gasket member 51 of a form as illustrated.

A center bolt member 52 may be composed of a metal bolt portion having a head 53 and its opposite end carrying threads 54. Portion 55 is formed from fusible metal and is adapted to melt and be blown from its normal position in case the valve assembly is exposed to abnormally high temperatures. An adjustment nut 56 has interior threads to mesh with the male threads 54 of the bolt 52.

A compression spring 57 held in compression by the nut 44 rests against the valve 47 as illustrated in Figure 2. The nut 44 has bent holes 58 for release of pressure during operation of the assembly.

Figure 3:
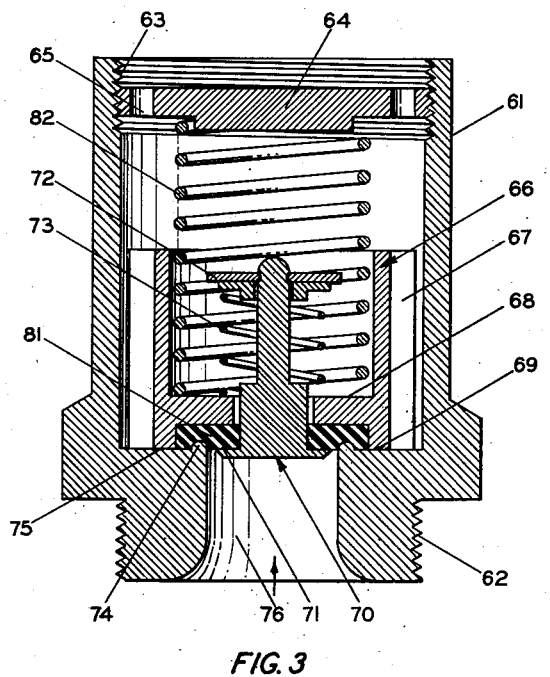
Figures 3 and 4 are sectional elevations of still other embodiment of our relief valve, in which the sealing member is held firmly in place by spring action.

Figure 3 illustrates still another embodiment of our excess pressure valve. In this figure, a body member 61 has some bottom threads 62 for insertion into a pressure cylinder or other container and some upper interior threads 63 for insertion of a spring tightening nut 64. This nut has a plurality of vent holes 65 for escape of gas during operation of the valve mechanism 66. This valve 66 has exterior guides 67, an annular shoulder member 68 and a bottom seat 69, similar to those of Figures 1 and 2. The annular shoulder forms an opening at its center into which is inserted the bolt member 70.

This bolt member consists of a head like portion having an annular flange 71 for contacting a resilient gasket 81 which fits into a space immediately below the annular shoulder 68 of the valve. The opposite end of this bolt may be grooved as illustrated for taking a spring retainer 72 or it may be threaded for taking a threaded take-up nut. Between this retainer 72 and the shoulder 68 is a compression spring 73.

The resilient gasket 81 rests upon an annular shoulder 74 of a valve seat 75. The diameter of the flange 71 is sufficiently small that the flange may move freely within the space 76 and yet sufficiently large that during operation the gasket 81 will not extrude through a space between the annular flange 71 and the annular shoulder 74.

A compression spring 82 is adapted to transmit compression from the take-up nut 64 to the valve 66 and hold the gasket 81 in contact with the seat members 74 and 75.

Figure 4:
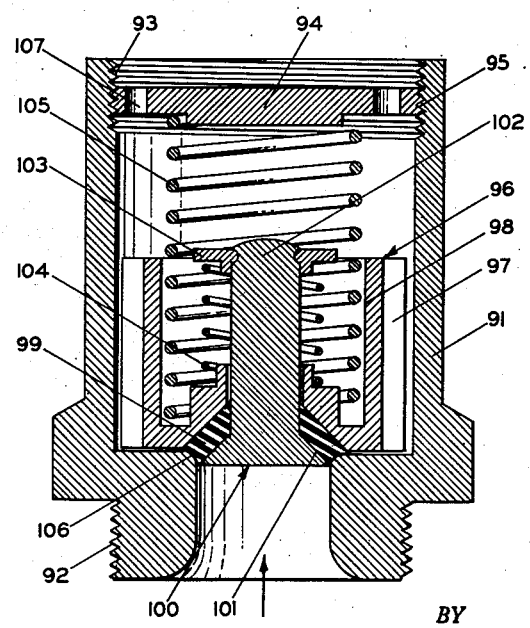

Figure 4 illustrates still another embodiment of our valve structure involving the same general principle of operation. In this embodiment, a valve body 91 has lower male threads 92 for installation of the assembly, and upper female threads 93 for meshing with a compression spring nut 94, which in turn has male threads 95. The valve assembly 96 like those described hereinbefore, has guide members 97, a body 98, a resilient gasket 99, and a conical heat bolt 100. The opposite end 102 of the bolt 100 may have a circular groove for accommodation of a U-clamp 103, or this bolt end may be threaded to take a threaded nut in place of the U-clamp 103. A spring 104 may be inserted under the U-clamp 103 for making certain that the conical surface 101 is in contact with the resilient gasket 99 at all times, especially under low pressure conditions.

A compression spring 105 holds the valve member 96 in contact with the edge of a valve seat 106. Openings 107 provide an exit for released gases.

Operation

In the operation of the valve embodiment of Figure 1, the spring adjustment nut is tightened sufficient that the valve assembly 20 will vent gas at a predetermined and fixed gas pressure. For example if propane gas is stored in a pressure cylinder at about 190 pounds per square inch at 100° F., it may be desirable to seat a relief valve to pop off pressure at say 300 pounds per square inch. The compression spring nut 27 is accordingly set at this value. When such a tank is in storage and pressure within reach, say, 250 pounds or more, conventional relief valves frequently begin to leak around their sealing gasket, and although pop off pressure may never be reached yet gas may leak around the gasket and be lost. When gas reaches such a pressure under the valve of Figure 1, the pressure exerted against the lower surface of the disc rivet 30 compresses the gasket 25 so that this gasket tends to flow away from the disc rivet 30, and accordingly tightens the seal between the gasket 25 and the seat 15 and sealing shoulder 14.

The greater the pressure acting on the bottom of the disc rivet 30 the greater is this pressure sealing tendency. Thus when such a compression spring as spring 26 would tend to approach its operational pressure, leakage normally permitted by very slight spring compression is, in fact, prevented by the tendency of the gasket 25 to be held more tightly against the surfaces of 15 and 14.

The embodiment shown in Figure 2 of the drawing operates in a similar manner to that of Figure 1. The greater the pressure upon the surface of the head of the bolt member 52 the greater is the tendency of the bolt head 53 to compress the gasket 51 adjacent the bolt head and to cause a tendency to extrude away from the bolt head and cause a tighter gasket-to-metal seal at the shoulder 45 and valve seat 46.

This embodiment has two added features, first, in the adjusting screw 56, and second, the fusible plug 55. The first feature, the adjusting screw, finds utility in keeping close contact between the conical surface of the bolt head 53 and the resilient gasket at all times regardless of how low the pressure acting against the bolt member 52 falls, while the latter finds utility in case of a fire or overheating from any cause when the fusible plug melts and permits an orderly release of pressure so that the vessel will not explode.

Figure 3 embodies the same general principle in that exertion of pressure on the head of bolt 70 causes compression of the gasket in the vicinity of this bolt. The resilient gasket accordingly tends to flow away from the bolt and to increase pressure of contact at other surfaces, as at shoulder 74 and the valve seat surface 75.

The spring 73 acts at all times to provide close contact between the annular flange 71 of the bolt and the gasket 81. This spring 73 need not be made of especially large and strong spring stock since its main function is merely to maintain a close contact between the bolt head shoulder 71 and the gasket 81 at times when this valve mechanism is exposed to low pressure within a cylinder. At high pressures, the higher pressure against the bolt head surface provides force for compression of the gasket.

The member 72 which transmits force from the spring 73 to the adjacent end of the bolt 70 may be a U-clip, as illustrated in Figure 3, or may be a threaded member so as to be adjustable with respect to threads (not shown) on the bolt end, or the bolt end may be drilled to accommodate a cotter key for holding a spring compression washer in place. Any other suitable means for making this connection may be employed.

The embodiment of Figure 4 operates in a similar manner in that pressure from within a container acts in the direction of the arrow against the head of the bolt 100. The gasket 99 is accordingly compressed and tends to flow in all directions. Pressure of contact is thus increased between the gasket 99 and the rounded shoulder 106 of the valve seat. This sealing pressure is greater, the higher the pressure acting against the head of bolt 100. Thus at pressures approaching valve opening pressure, leaking tendencies are markedly retarded.

The bolt end adjacent the U-clamp 103 may be grooved as shown for accommodation of such a U-clamp, or may be threaded for taking a threaded spring take-up member, or may be drilled for a cotter key-washer assembly, as mentioned relative to the embodiment of Figure 3.

In all these embodiments, the main compressive springs are such that by proper adjustment of the spring take-up nuts, the valves may be made to release gas at predetermined pressures. And our valves are so constructed that leakage is prevented at pressures below pop off pressures by compression of the resilient gasket, this compressive and sealing force is directly proportional to the gas pressure acting on the bolt head so that at higher pressures the tendency to prevent gas leakage is greater than at lower pressures.

Such excess pressure valves as herein described may be made of commercially available materials suitable for such purpose. Brass may be used for the valve bodies, and valve and bolts, take-up nuts and like parts. The springs may be made of standard spring stocks.

Special materials are not required, excepting in cases where the valves are to be used with drums or containers in which corrosive gases are stored. In such cases materials may be selected from among those less susceptible to corrosion, etc.

The resilient gaskets may be made of natural rubber, synthetic rubber or other stock suitable for specific storage problems.

It will be obvious to those skilled in such art that many variations and modifications of excess pressure valves may be made using our principle of preventing leakage and yet remain within the intended spirit and scope of our invention.

Having disclosed our invention, we claim:

1. A pressure relief valve comprising, in combination, a valve seat, a valve head having a flanged portion, means for urging said head into engagement with said seat, a gasket of resilient material mounted on the flanged portion of said head for sealing the joint between said head and said seat, said gasket having a generally cylindrical inner wall defining a central opening therein and a smooth circular surface adjoining and angularly related to said wall, and a pressure member freely mounted for sliding movement in said head, said member having a portion at one end thereof engaging and complementary with a substantial part of the wall and surface of said gasket throughout the entire circumference thereof, said pressure member having an exposed surface at the high pressure side of said valve head and another exposed surface at the low pressure side of said valve head, whereby the pressure differential between said surfaces is effective to move said member, thereby to deform said gasket and tightly seal the joint between said head and said seat.

2. A pressure relief valve comprising, in combination, a valve seat, a valve head having a generally frusto-conical recess formed therein, a relatively strong spring for urging said head into engagement with said seat, an annular resilient gasket mounted in said frusto-conical recess, said gasket including a wall defining a cylindrical opening therein and a frusto-conical surface angularly related to said wall, a screw extending through said gasket, said screw having a head engaging a substantial portion of said frusto-conical surface throughout the entire circumference thereof and a shank engaging a substantial portion of said cylindrical wall of the gasket throughout the entire circumference thereof, the head of the screw being exposed at the high pressure end of the valve, the shank of the screw being exposed at the low pressure end of said valve, and a relatively weak spring for urging the head of said screw into engagement with said gasket.

OWEN L. GARRETSON.

References Cited in the file of this patent

UNITED STATES PATENTS

| Number | Name | Date |
|---|---|---|
| 666,245 | Ginaca | Jan. 15, 1901 |
| 763,208 | Robinson | June 21, 1904 |
| 1,157,196 | Von Philip | Oct. 19, 1915 |
| 1,274,680 | Calvert | Aug. 6, 1918 |
| 1,301,278 | Labus | Apr. 22, 1919 |
| 1,613,072 | Wilson | Jan. 4, 1927 |
| 1,725,297 | Paterson | Aug. 20, 1929 |
| 2,107,200 | Kennon | Feb. 1, 1938 |
| 2,131,928 | Abegg | Oct. 4, 1938 |
| 2,323,237 | Payne | June 29, 1943 |
| 2,482,198 | Melichar | Sept. 20, 1949 |

FOREIGN PATENTS

| Number | Country | Date |
|---|---|---|
| 516,600 | Germany | of 1931 |